Nov. 8, 1966 K. BOCHMANN ETAL 3,284,771

CIRCUIT ARRANGEMENT FOR ASCERTAINING FAULTY TELEGRAPH SYMBOLS

Filed March 7, 1961 5 Sheets-Sheet 1

Nov. 8, 1966

K. BOCHMANN ETAL

CIRCUIT ARRANGEMENT FOR ASCERTAINING FAULTY TELEGRAPH SYMBOLS 3,284,771

Filed March 7, 1961

5 Sheets-Sheet 4

United States Patent Office 3,284,771
Patented Nov. 8, 1966

3,284,771

CIRCUIT ARRANGEMENT FOR ASCERTAINING FAULTY TELEGRAPH SYMBOLS

Karlheinz Bochmann, Munich, and Kurt Fitznar, Munich-Solln, Germany, assignors to Siemens & Halske Aktiengesellschaft, Berlin and Munich, Germany, a corporation of Germany Filed Mar. 7, 1961, Ser. No. 94,036
Claims priority, application Germany, Mar. 14, 1960, S 67,555
8 Claims. (Cl. 340—146.1)

This invention is concerned with a circuit arrangement for recognizing or ascertaining erroneous or faulty telegraph symbols. The various objects and features of the invention will be better understood after first considering some antecedents.

In order to provide for secured transmission of telegraph symbols, there are used so-called securing codes which employ redundance in the transmission of symbols, utilizing such redundance for ascertaining transmission errors. The securing code may, for example, provide for a predetermined ratio between mark and space elements, such ratio being in connection with the 7-element code 3 to 4. Another possibility for the securing resides in true or mirror-like repetition of symbols. Several symbols (a block) may also be secured by one or more control signals.

The normal 5-element teleprinter code (CCIT No. 2) does not utilize redundance in the transmission of symbols.

The teleprinter signals (elements) of the 5-element code appear as double or dual current polarity signals or as double single polarity current signals. These 5-element code signals are converted into the 7-element securing code which is employed for the transmission, for example, over a wireless channel which is subject to trouble, such securing code, which employs redundance, making it possible to effect automatic error correction. The 7-element code secures the transmitted symbols to a large extent against falsification or mutilation; however, the circuits including the connecting lines extending from the punched tape transmitter (which operates with the 5-element code) to the converter (which converts such code into the 7-element code) are unprotected against transmission errors. For example, poor operation of the punched tape scanning contacts can result in false 5-element code teleprinter symbols, thereby producing, after conversion thereof into the 7-element securing code, transmission errors.

The present invention is based upon recognition of the fact that there is, in cases in which the telegraph signals are present as double or dual polarity current signals or as double single polarity current signals, a certain redundance, even when the code employed is not secured against errors.

The invention therefore employs for the recognition of erroneous or faulty teleprinter symbols coded in the 5-element code (CCIT Code No. 2), with simultaneous transmission of element polarities of each symbol over parallel lines extending from a punched tape transmitter to the converter, the redundance which is present incident to the transmission of the double polarity current or double single polarity current symbol elements, for signalling, by means of a supervising circuit, faulty symbols and/or for blocking the symbol transmission or symbol evaluation.

An advantageous embodiment of the invention provides, in the case of double or dual polarity current operation, a supervising relay per line, and in the case of double single polarity current operation, a supervising relay per pair of lines, such supervising relay being in normal operation either operatively energized (or released) and being in the presence of voltages or currents on the line or the pair of lines, which deviate by predetermined values from the normal operation, caused to release (or to energize) so as to signal over its contact or contacts a disturbed or faulty symbol and if desired to prevent the evaluation thereof.

Another embodiment of the invention provides a gate circuit which supervises the voltages or currents appearing on the parallel lines, such gate circuit being responsive to deviations of the voltages or currents, by predetermined amounts, from normal operation, operative to deliver at its output a trouble criterion which can be employed, if desired, to prevent the evaluation of the corresponding symbol.

Further objects, features and details of the invention will appear from the description of embodiments thereof which will be rendered below with reference to the accompanying drawings.

Figure 1:
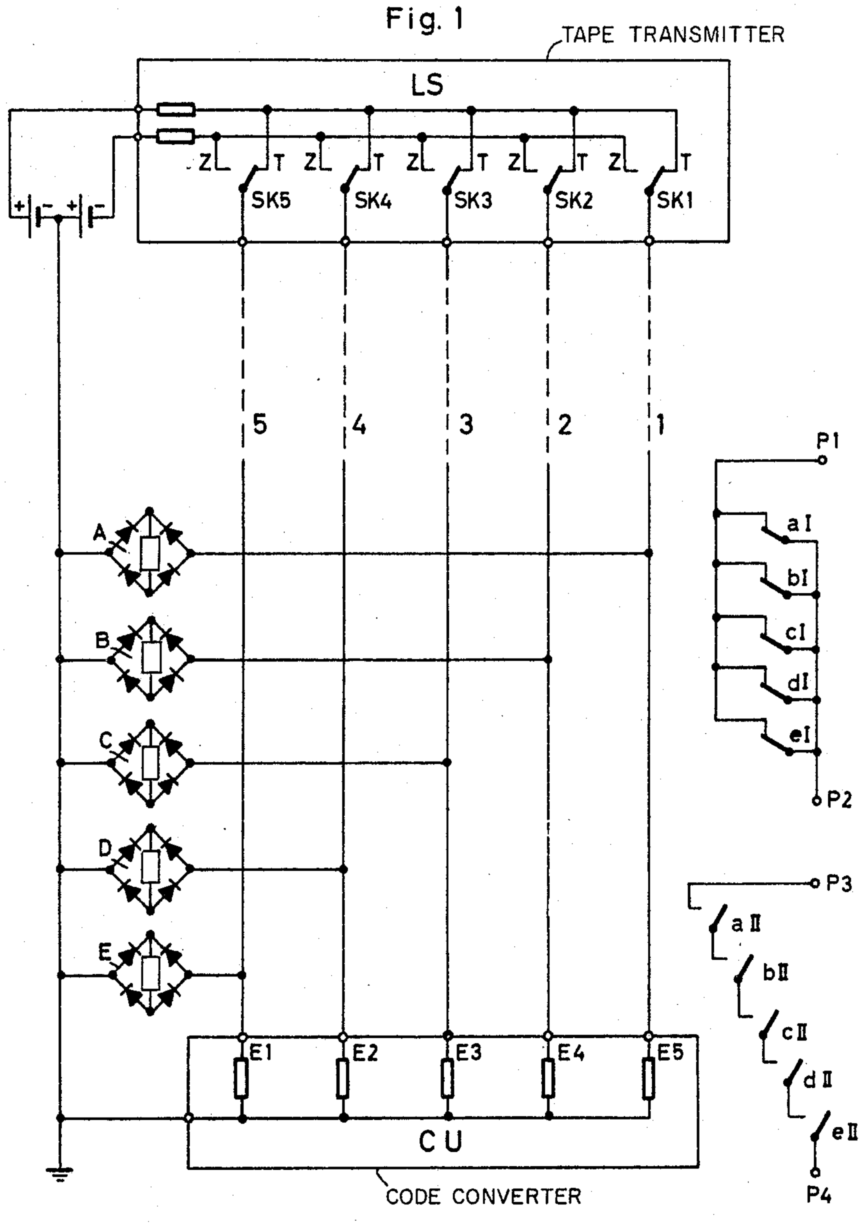
FIG. 1 shows an embodiment for double or dual polarity current operation.

In FIG. 1, each of the five transmitter contacts SK1 to SK5 of a 5-element code punched tape transmitter LS delivers over the lines 1 to 5 dual polarity current to the inputs E1 to E5 of a code converter CU which produces in known manner the 7-element securing code which is transmitted. So long as there is no error at the transmitter contacts SK1 to SK5 and on the connecting lines 1 to 5, current will flow over bridge circuits A to E, respectively cooperatively connected with the lines 1 to 5, each bridge circuit comprising four rectifiers and a supervising relay. In case an error occurs on one or the other transmitter contacts SK1 to SK5 or on one or the other of the connecting lines 1 to 5, for example, a short circuit between the space and mark sides of the respective transmitter contacts SK1 to SK5, or a ground on or interruption of one or more of the connecting lines 1 to 5, the relay of the bridge circuit cooperating with the respective troubled lines 1 to 5, will restore and close its associated contact such as *a*I . . . *e*I while opening its associated contact such as *a*II . . . *e*II, such contacts being shown in normal position of the associated relays. A circuit will thus be closed between the terminals P1 and P2 and the connection between terminals P3 and P4 will be opened. Accordingly, upon appearance of an error, a criterion is obtained which can be utilized for error indication and, if desired, for stopping the operation of the 5-element code punched tape transmitter LS and for releasing an alarm signal.

Figure 2:
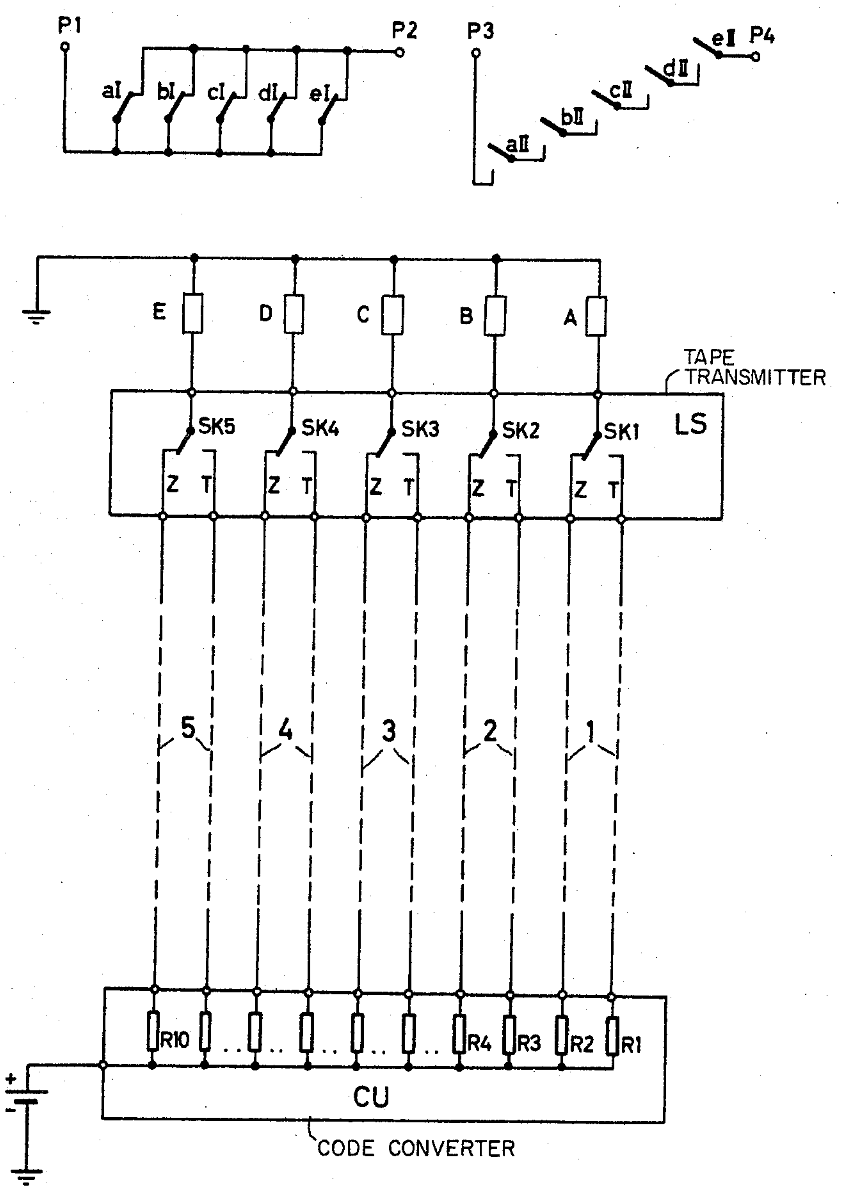
FIGS. 2, 3, 4 and 5 represent embodiments for operation with double single polarity current.

In the embodiment for double single polarity current operation, shown in FIG. 2, each of the five transmitter contacts SK1 to SK5 of the 5-element code punched tape transmitter LS places ground potential on one or the other T or Z (space or mark) of respective pairs of lines 1 to 5, the other ends of these lines being at the code converter CU connected to positive voltage over respective suitably dimensioned resistors R1 to R10. The windings of the five supervising relays A–E are in the absence of errors traversed by current. The testing circuits between the terminals P1, P2 or P3, P4 are constructed as explained in connection with FIG. 1 and the relay contacts *a*I–*e*I and *a*II–*e*II are accordingly respectively opened and closed. Upon interruption at one of the transmitter contacts or of a connecting line or direct ground on the space or mark side (T, Z) of a transmitter contact, the respective cooperatively disposed relay A–E will deenergize and its associated contacts will close a circuit between the terminals P1 and P2 while opening the circuit between the terminals P3 and P4, thereby again producing the desired error criterion for the purposes noted before.

Figure 3:
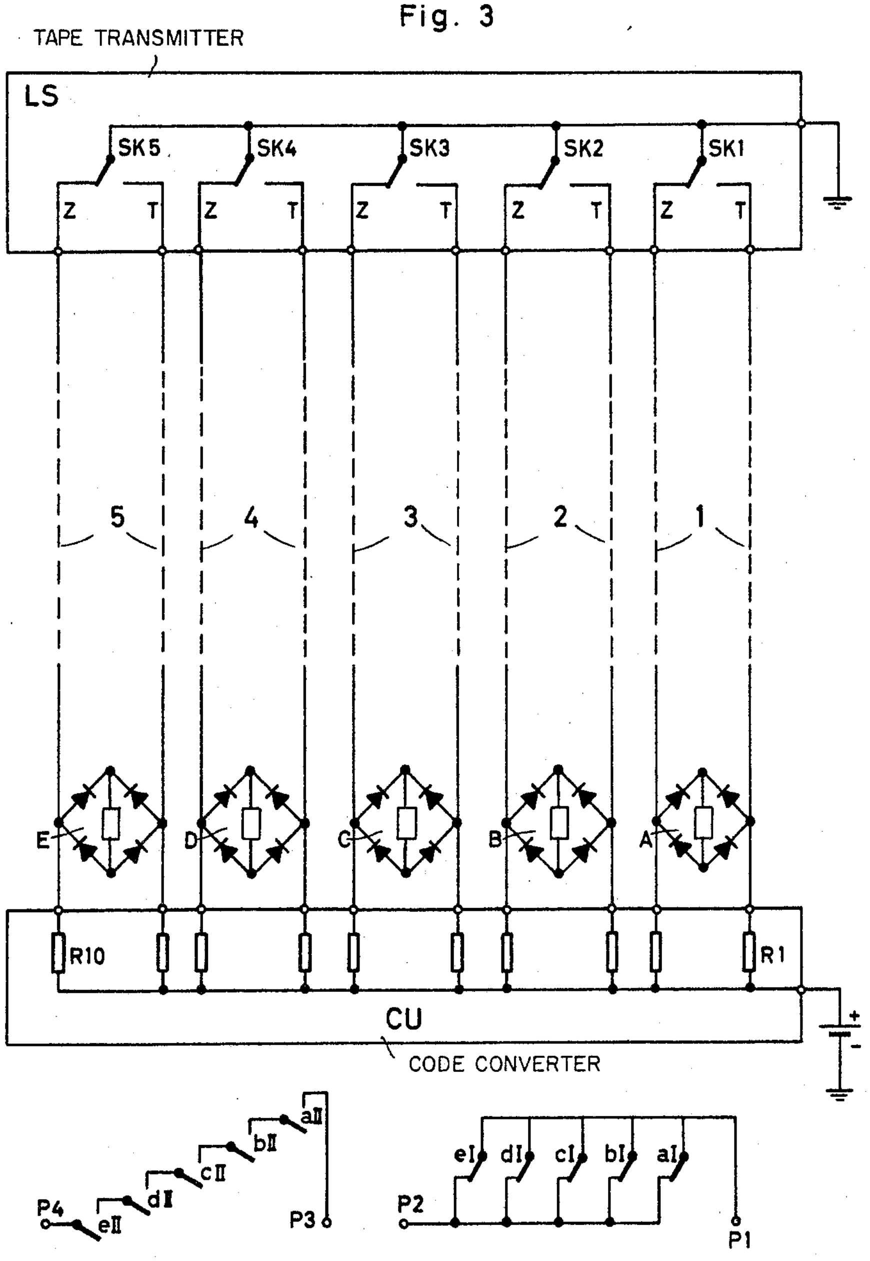

As compared with the embodiment shown in FIG. 2, the supervising relays A–E are in the example for double single polarity current operation shown in FIG. 3, differently connected, namely, each such relay is included in a rectifier circuit which is disposed between the conductors of a pair of lines such as 1 to 5. In normal operation, that is, in error-free operation, all these supervising relays are operatively energized and the testing circuit extending between the terminals P1, P2 is open while the testing circuit between the terminals P3, P4 is closed. Upon appearance of an error, the respectively affected supervising relay will restore and the testing circuit P1, P2 will be closed while the testing circuit between P3, P4 is opened. The error criterion thus obtained is evaluated as explained before.

Figure 4:
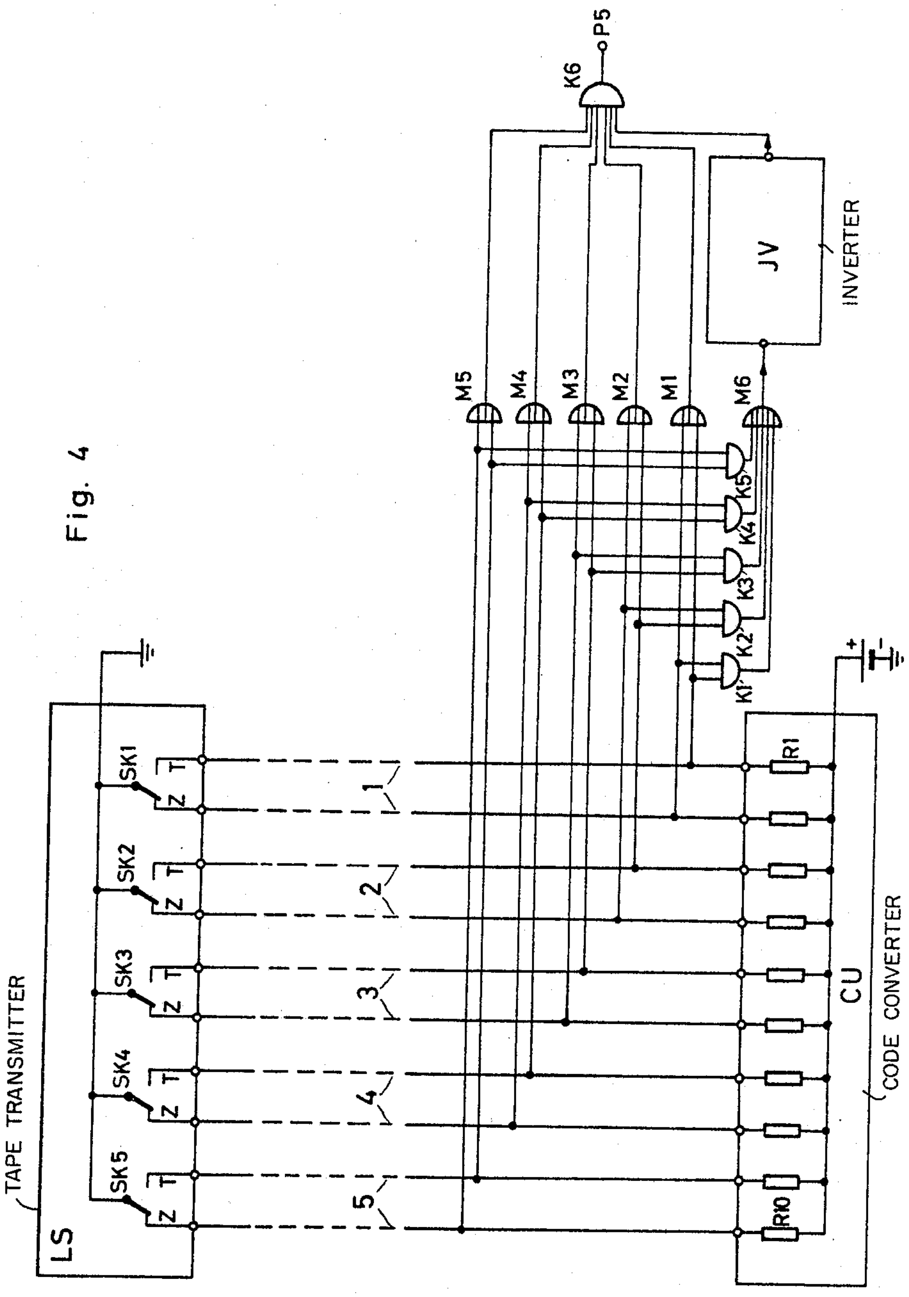

The example for double single polarity current operation, illustrated in FIG. 4, instead of utilizing relays for the supervision, employs for this purpose a gate circuit comprising coincidence gates and mixing gates. The operation is as follows:

In normal trouble-free or error-free operation, a line of each pair of lines 1–5 is in accordance with the position of the respective transmitter contacts SK1–SK5 connected with positive voltage over a resistor such as R1 to R10. Accordingly, so long as the connecting lines 1–5 and the transmitter contacts SK1 to SK5 are free of trouble, each of the five mixing gates M1 to M5 will have positive voltage at its output. Moreover, only one input of the respective coincidence gates K1 to K5 will at any time be on positive potential, so that positive potential will not appear at the outputs of any of these coincidence gates and zero potential over the mixing gate M6 will accordingly be on the input of the inverter JV. With zero potential on its input, the inverter JV will give off positive voltage at its output, and vice versa. Therefore, in the case of error-free operation, positive voltage will appear at the output of the inverter JV and all inputs of the coincidence gate K6 will be on positive voltage. Positive voltage will also be on the output P5 of the last noted coincidence gate K6.

In case of interruption of one of the ten connecting lines or at one of the five transmitter contacts SKI to SK5, the respectively associated coincidence gate K1 to K5 will receive positive voltage at both of its inputs and will extend such voltage over the mixing gate M6 to the input of the inverter JV. At the output of the inverter then appears zero potential and the coincidence gate K6 will be blocked. At the output P5 of this coincidence gate will also appear zero potential. This change in potential at the output P5 (from positive to zero potential) can be suitably utilized for stopping the punched tape transmitter LS for the duration of the trouble and, if desired, for actuating an alarm device.

The operation is similar in case of grounding of one of the ten connecting lines and also in case of a short circuit between the space and mark sides of the respective transmitter contacts SK1 to SK5. The mixing gate such as M1 to M5 which is cooperatively associated with the grounded or short-circuited line will receive zero potential on both its inputs and extends such potential over its output to an input of the coincidence gate K6, the latter gate thus becoming blocked, with the result that zero potential will appear at its output P5.

Figure 5:
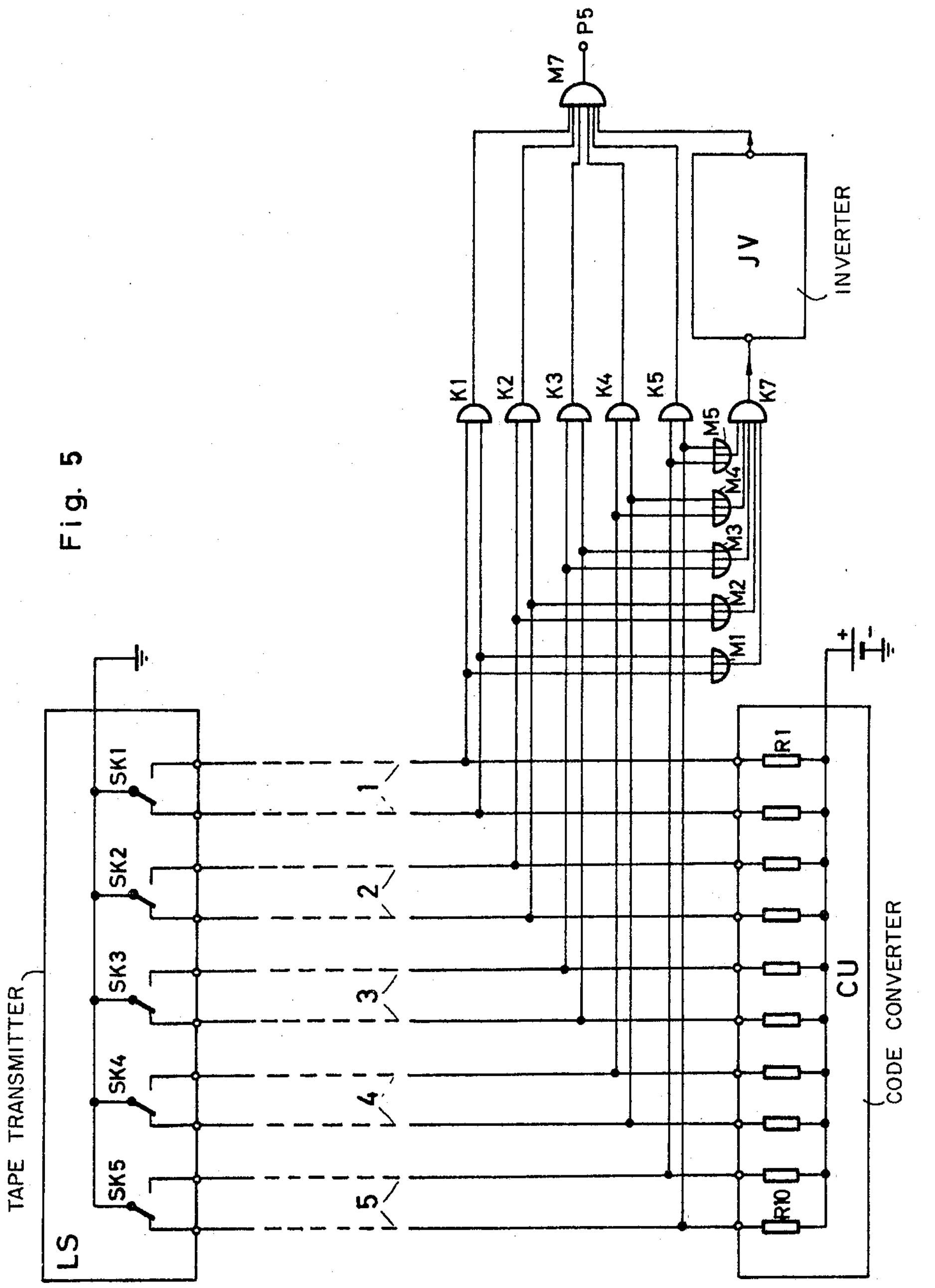

The operation of the embodiment according to FIG. 5 is similar to that of the example above explained with reference to FIG. 4. In FIG. 5, zero potential will normally appear at the output terminal P5 since the coincidence gates K1 to K5 are in such case blocked while the coincidence gate K7 is opened over the mixing gates M1 to M5. The positive potential appearing at the output of the coincidence gate K7 is converted to zero potential by the inverter JV and zero potential from the mixing gate M7 will accordingly likewise appear at the output P5.

In case of grounding of one of the ten connecting lines or in the case of a short circuit between the space and mark sides of a transmitter contact SK1 to SK5, the mixing gate such as M1 to M5 which is cooperatively associated with the grounded line or with the short circuited contact, will receive zero potential at both its inputs, and the coincidence gate K7 will be blocked. The inverter delivers in such case positive potential at its output and positive potential will accordingly also appear at the output P5 extending from the mixing gate M7. Such positive potential can again be suitably utilized for stopping the operation of the punched tape transmitter LS and for effecting other desired trouble signalling operations.

The operation is similar in case of interruption of one of the ten connecting lines or in case of interruption of one of the five transmitter contacts. The coincidence gate K1–K5 which is cooperatively associated with the troubled line or contact will receive positive potential at both its inputs and extends such potential over its output to the input of the mixing gate M7, thus producing positive potential at the output terminal P5 connected therewith.

In order to avoid operative actuation of the supervising device during the switch-over intervals of the scanning or feeler contacts such as SK1–SK5 of the five-element code punched tape transmitter, the individual supervising relays of the embodiments according to FIGS. 1 to 3 may be provided with suitable release delay while the testing circuits according to FIGS. 4 and 5 are scanned only at the instants in which the potentials of the connecting lines are also scanned in the code converter. It is understood, of course, that the embodiments according to FIGS. 1 to 5 can be modified or supplemented within the scope of the invention as may be desired or required in particular instances of the use thereof.

Changes may be made within the scope and spirit of the appended claims which define what is believed to be new and desired to have protected by Letters Patent.

We claim:

1. A circuit for ascertaining errors occurring in the symbol transmission of telegraph symbols, particularly teleprinter symbols encoded in 5-element code, comprising parallel transmission means over which the element polarities of each symbol are transmitted, a supervising device for each code element transmission means operatively connected to its associated transmission means, each such supervising device being constructed to produce a predetermined operating condition during normal error-free symbol transmission over the respective transmission means associated therewith and to produce another operating condition responsive to deviation in the associated transmission means from normal operation by predetermined amounts, and means common to and controlled by said supervising devices responsive to the respective existing conditions at such devices providing a criterion with respect to erroneous symbol transmission.

2. A circuit arrangement according to claim 1, wherein relay means constitute said supervising devices.

3. A circuit arrangement according to claim 2, wherein the element polarities are transmitted by dual polarity current over transmission means comprising respective lines, corresponding in number to the number of code elements, said relay means comprising a relay for each line cooperatively associated therewith.

4. A circuit arrangement according to claim 2, wherein the element polarities are transmitted by double single-polarity current over transmission means comprising pairs of lines, said relay means comprising a relay for each pair of lines cooperatively associated therewith.

5. In the art of transmitting telegraph symbols, particularly teleprinter symbols encoded in 5-element code, wherein the element polarities of each symbol are transmitted over parallel transmission means, a circuit arrangement for ascertaining errors occurring in the symbol transmission comprising a supervising device, in the form of gate circuit means, for each code element transmission means operatively connected to its associated transmission means for supervising the electrical conditions obtaining thereon, each such supervising device being constructed to produce a pre-determined operating condition during normal error-free symbol transmission over the respective transmission means associated therewith and to produce another operating condition responsive to deviation in the associated transmission means from normal operation by predetermined amounts, and means controlled by said supervising devices responsive to the respective existing conditions at such means for producing at the output thereof an error criterion responsive to deviation by predetermined values of electrical conditions on the associated transmission means resulting from erroneous symbol transmission.

6. A circuit arrangement according to claim 5, wherein said element polarities are transmitted by single polarity current over transmission means, each of which comprises a pair of lines, said gate circuit means comprising for each pair of lines a coincidence gate having two inputs which are respectively connected with the lines of the corresponding pair, and a mixing gate having two inputs likewise connected with the respective lines of the corresponding pair, the outputs of said gates being operatively connected to said error criterion-producing means.

7. A circuit arrangement according to claim 6, comprising another coincidence gate having inputs connected with the outputs of said mixing gates, a further mixing gate having inputs connected with the outputs of the first named coincidence gates, an inverter having an input connected with the output of said further mixing gate, and means for connecting the output of said inverter with an input of said other coincidence gate at the output of which appears the error criterion.

8. A circuit arrangement according to claim 6, comprising another mixing gate having inputs connected with the outputs of said coincidence gates, a further coincidence gate having inputs connected with said mixing gates, an inverter having an input connected with the output of said further coincidence gate, and means for connecting the output of said inverter with an input of said other coincidence gate at the output of which appears the error criterion.

References Cited by the Examiner

UNITED STATES PATENTS

| | | | |
|---|---|---|---|
| 2,275,126 | 3/1942 | Bonorden | 178—69 |
| 2,471,126 | 5/1949 | Spencer et al. | 340—146 |
| 2,971,055 | 2/1961 | Grottrup et al. | 178—23.1 |
| 2,989,729 | 6/1961 | Schafer | 178—23.1 |

MALCOLM A. MORRISON, *Primary Examiner.*

NEWTON N. LOVEWELL, *Examiner.*

M. P. ALLEN, E. M. RONEY, A. J. DUNN,
*Assistant Examiners.*